United States Patent
Kronman

Patent Number: 6,161,534
Date of Patent: *Dec. 19, 2000

[54] METHOD AND APPARATUS FOR CONVERTING A GAS GRILL AND/OR CHARCOAL BURNING GRILL

[76] Inventor: Leonard Kronman, 23 Bartlett St., Charlestown, Mass. 02129

[*] Notice: This patent issued on a continued prosecution application filed under 37 CFR 1.53(d), and is subject to the twenty year patent term provisions of 35 U.S.C. 154(a)(2).

[21] Appl. No.: 08/898,934

[22] Filed: Jul. 23, 1997

[51] Int. Cl.[7] ....................................... F24C 3/00
[52] U.S. Cl. ................... 126/41 R; 126/25 R; 99/340; 99/445; 99/450
[58] Field of Search ................. 126/41 R, 25 R; 99/340, 445, 450

[56] References Cited

U.S. PATENT DOCUMENTS

| | | |
|---|---|---|
| 1,956,387 | 4/1934 | Hartman . |
| 3,186,331 | 6/1965 | Dettling . |
| 3,443,510 | 7/1974 | Sanson et al. . |
| 3,946,651 | 3/1976 | Garcia . |
| 4,140,049 | 2/1979 | Stewart . |
| 4,508,024 | 4/1985 | Perkins . |
| 4,553,524 | 11/1985 | Wheat et al. . |
| 4,598,634 | 7/1986 | Van Horn, II . |
| 4,606,261 | 8/1986 | Bernardi . |
| 4,628,897 | 12/1986 | Stanfa et al. . |
| 4,679,543 | 7/1987 | Waltman et al. ............ 126/25 R |
| 4,727,853 | 3/1988 | Stephens et al. . |
| 4,759,276 | 7/1988 | Segroves ....................... 126/41 R |
| 4,777,927 | 3/1988 | Stephen et al. . |
| 4,819,614 | 4/1989 | Hitch . |
| 4,899,724 | 2/1990 | Kuechler ....................... 126/41 R |
| 4,966,125 | 10/1990 | Stephen et al. . |
| 5,031,602 | 7/1991 | Vick . |
| 5,065,734 | 11/1991 | Elliott . |
| 5,070,857 | 12/1991 | Sarten . |
| 5,121,738 | 6/1992 | Harris ........................... 126/41 R |
| 5,167,183 | 12/1992 | Schlosser et al. . |
| 5,168,796 | 12/1992 | Porton et al. . |
| 5,197,379 | 3/1993 | Leonard, Jr. . |
| 5,211,105 | 5/1993 | Liu . |
| 5,226,405 | 7/1993 | Snow . |
| 5,237,914 | 8/1993 | Carstensen . |
| 5,247,978 | 9/1993 | Zuran . |
| 5,259,299 | 11/1993 | Ferraro . |
| 5,277,106 | 1/1994 | Raymer et al. . |
| 5,279,277 | 1/1994 | Barker . |
| 5,481,965 | 1/1996 | Kronman . |

OTHER PUBLICATIONS

"Convert–A–Grill (™) Proven in America's Leading Restaurants/Hotels/Caterers", advertisement, Natural Grilling and Fuel Systems, Inc., publication date unknown.

Primary Examiner—Larry Jones
Attorney, Agent, or Firm—Leonard Heyman

[57] ABSTRACT

Backyard type gas grills are made suitable for use with solid fuels such as charcoal by removing existing passive radiant heat material such as lava rocks and inserting an apparatus comprising supports (50) and perforated fuel basket (40). The unique design of the invention allows for its implementation in a majority of gas grills on the market by permitting the supports (50), which rest on at least a gas burner, to be positioned and fastened to the fuel basket (40) anywhere and in various directions with respect to the fuel basket (40). Locking means (56) prevent separation of the supports from the fuel basket. By locking the supports (50) to the fuel basket (40), the supports add structural integrity to the fuel basket and prevent the basket from warping and torquing due to repeated exposure to extreme temperature differentials.

14 Claims, 4 Drawing Sheets

METHOD AND APPARATUS FOR CONVERTING A GAS GRILL AND/OR CHARCOAL BURNING GRILL

BACKGROUND

Backyard gas grills have become extremely popular with the typical consumer. They are viewed as being more convenient than charcoal or wood grills because they don't require messy charcoal or wood, they are easy to light, they generally take less time to heat up, and there's no ash to deal with after the grill cools down.

The problem with gas grills is that they generate a moist heat of moderate temperature only. The superior qualities of charcoal and wood fuels, hereinafter "solid fuel", have been known for years. Solid fuels burn hotter and drier than natural gas or propane. This hot dry heat is preferable because it sears food, sealing in moisture, cooks faster, and provides a better tasting result.

The present invention mitigates the problems associated with both gas grills and charcoal grills by providing a fuel basket for holding solid fuel supported above the gas burner in a gas grill. Using this configuration, the solid fuel is easily ignited using the gas burner. Once ignited, the solid fuel cooks the food using the characteristic hot, dry heat associated with charcoal or wood. Consequently, foods grilled using solid fuel cook 20% faster than those grilled using gas alone. Additionally the foods are moister, and, if real wood charcoal is used, are flavored accordingly. The cost of the solid fuel is offset by a reduced consumption of natural gas or propane. Additionally, the invention does not interfere with the normal gas operation of the grill as a gas grill.

One of the primary advantages of the present invention over previous attempts at providing useful solid fuel conversion kits to consumers is that installation is simple, and the device can be easily configured for installation in a variety of manufacturers' gas grills, no matter what the configuration of the gas burner. In fact, the present invention has been tested on a variety of gas grills and every model tested has accommodated the fuel basket and support structure without difficulty.

SUMMARY OF THE INVENTION

The invention provides a fuel basket for holding and supporting solid fuel over and above gas burners of a backyard-type gas grill. The fuel basket is supported by fuel basket supports made from heavy-gauge angle iron. The apex of the angle-iron is attached to the fuel basket by locking means. The angle iron supports are positioned over the gas burners in a backyard-type gas grill during installation and the fuel basket is then placed on the supports and locked in place to prevent separation of the basket from the support. The present invention contemplates several embodiments of locking means, including cotter-pins passing through orifices in at least two projections which project from the apex of each support through perforations in the basket; screw-type fastening means; locking snap-on washers; and a snap-fit posts extending up from the apex of the support which lock in place inside the perforations of the basket.

The use of angle-iron supports having locking means is a novel aspect of this invention and enables the supports to be positioned anywhere in different directions relative to the fuel basket, thus ensuring that the invention can be installed to retrofit practically every backyard-type gas grill on the market. The device will even work in most indoor gas grills, although it is not recommended unless there is a ventilation hood and exhaust fan capable of handling the exhaust and heat generated by solid fuels. An additional advantage of the angle-iron supports with the locking means is that the angle irons add structural integrity to the fuel basket, reducing warpage and torquing of the fuel basket due to the extreme temperature extremes to which the fuel basket is repeatedly subjected.

The fuel basket is made from $\frac{1}{16}$ inch (1.6 mm) gauge steel or iron and is perforated at least along its bottom to permit air to flow up and react with the solid fuel. The basket may be painted or porcelainized, or left unfinished. The perforations are of any shape but are preferably round with a diameter of preferably about $\frac{3}{16}$ inch (4.8 mm) and about $\frac{1}{4}$ inch (6.4 mm) center-to-center. In use, the fuel basket is supported by fuel basket supports produced from one inch (2.5 cm) angle iron with a gauge of preferably about $\frac{1}{8}$ inch (3.2 mm).

Another aspect of the present invention is provided in a method for converting a gas grill to enable the use of solid fuels. To carry out the inventive method, first the cooking grate is removed. Next, any radiant bars or lava rocks and any supporting grates for the lava rocks are all removed. Next, the fuel basket supports are placed on top of the gas burners—if there are two or more straight burners, then the supports go right on top along the length of two of the burners, if there is a single circular burner, the supports are laid across it, parallel to one another. Solid fuel, such as 100% pure wood charcoal, is placed in the fuel basket, and finally, the cooking grate is replaced. The gas burners will operate normally, and can be used to ignite the solid fuel. Once the solid fuel is ignited, the gas burners are shut off and the grill functions as a charcoal grill. If desired, the grill will function normally as a gas grill without any solid fuel placed in the basket.

In addition to functioning as a wood or charcoal grill, the present invention also makes it possible for gas grills to function as hot or cold smokers. By placing a small amount of fuel on one side of the grill opposite the food and closing the hood of the grill (not shown), a few pieces of wood such as hickory on top of the fuel, the food can be hot smoked. For cold smoking, a tray of ice is placed on the fuel basket or the grill itself to reduce the temperature inside the grill, allowing the smoke to flavor and preserve the food without cooking it.

DETAILED DESCRIPTION OF THE PREFERRED EMBODIMENT

Apparatus

Figure 1:
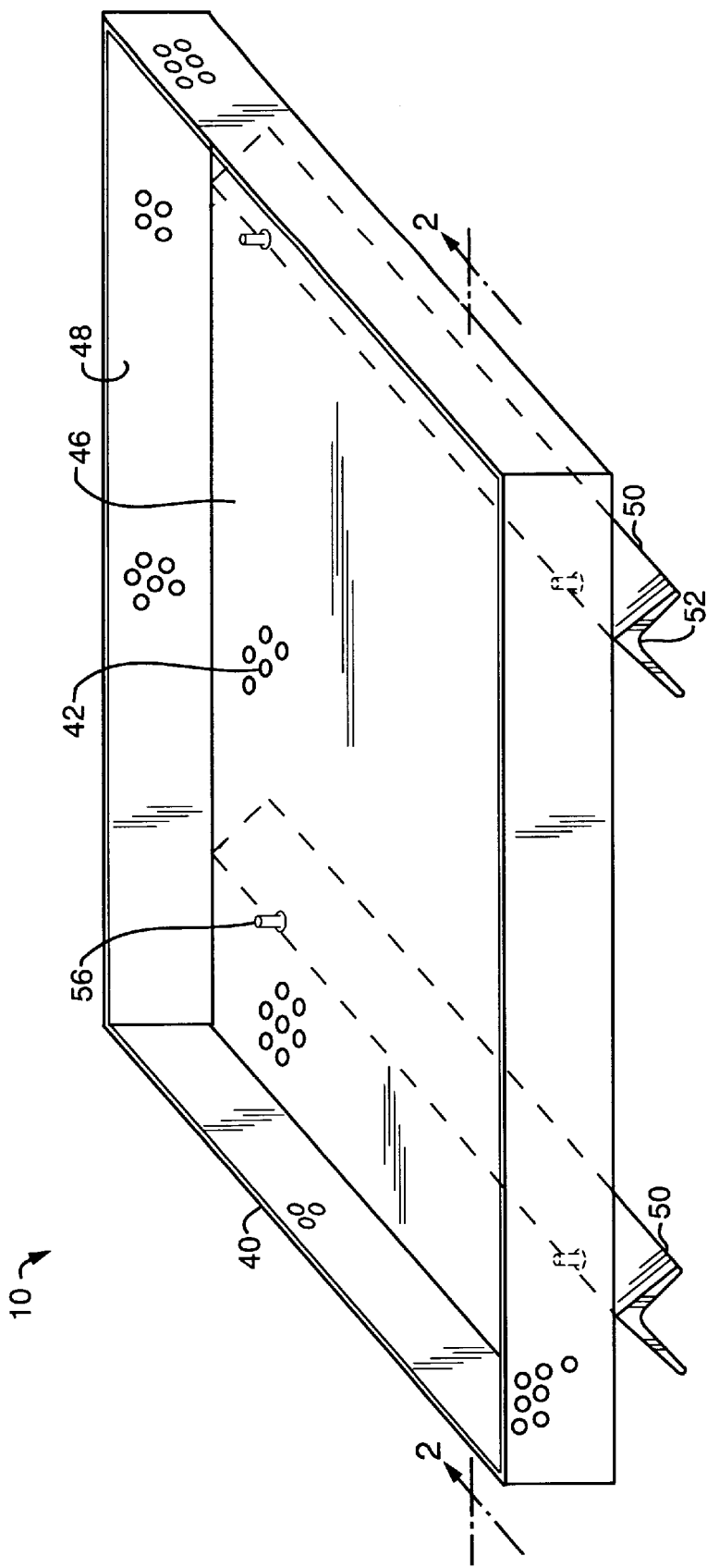
FIG. 1 shows the invention fully assembled

As seen in FIG. 1, the invention comprises fuel basket 40 made of perforated steal or iron having a thickness of approximately $\frac{1}{16}$ inch (4.8 mm) a width of approximately 10 inches (25 cm) a length of approximately 15 inches (38 cm) and a depth of about 1¼ inch (3.2 cm). The basket 40 is perforated at least throughout its bottom 46, but its sides 48 can also be perforated. The perforations 42, of which only exemplary perforations are shown in FIG. 1, are preferably round and 3/16 inch (4.8 mm) in diameter and about ¼ inch (6.4 mm) from center to center, arranged in a honey-comb fashion.

The fuel basket can be porcelainized, painted or left unfinished. Porcelainizing the fuel basket will inhibit carbon loss and metal burn-out under extreme temperatures, which will help it retain its tensile strength longer. Alternatively, the basket could be painted with a food-safe "stove paint" which will enhance the appearance of the fuel basket when new but not its material properties. The stove paint will mostly burn off after the first or second use of the fuel basket. If left untreated, the basket could rust before its first use if not packaged properly, but a small amount of rust would not adversely affect its performance during use.

Each fuel basket 40 is provided with at least two supports 50. The supports are formed from a length of steel or iron having an L-shaped cross-section having one inch (2.5 cm) legs extending at 90° from each other from an apex 52. Attached to the apex 52 of each of the supports are at least two locking means 56 which secure the fuel basket 40 to supports 50.

Figure 3:
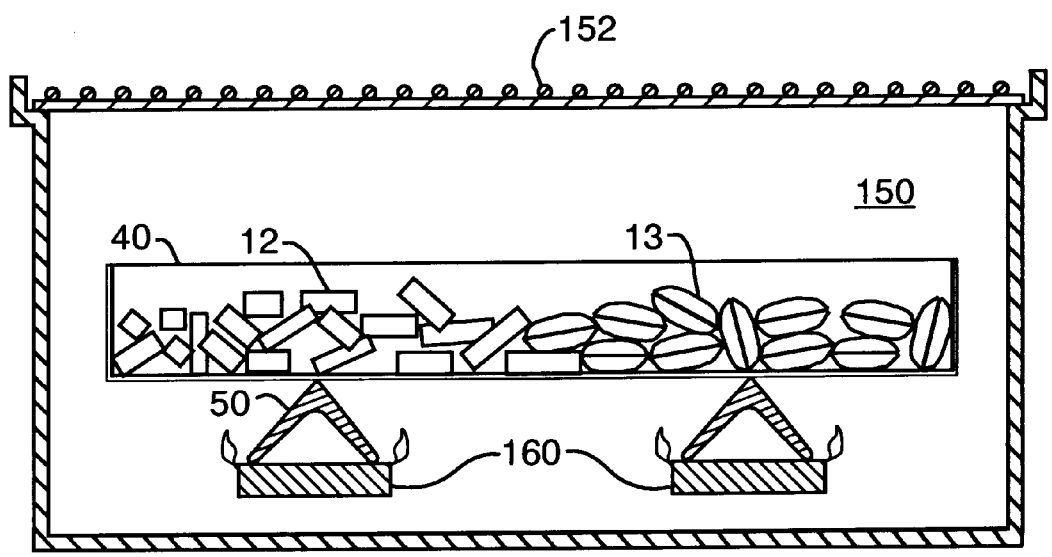
FIG. 3 shows the same gas grill with the invention installed therein.

The supports perform the function of maintaining the fuel at an appropriate height relative to the gas burners 160, shown in FIG. 3, to ensure the normal operation of the gas burners, which allow the gas grill to operate normally as a gas grill with no solid fuel in the fuel basket. Additionally, when properly fastened to the fuel basket, the supports add structural integrity to the fuel basket, thereby inhibiting warping or torquing of the basket resulting from repeated exposure to extreme temperature differentials. Finally, when the burners are arranged in straight lines and the supports are placed along the burners directly on top of the burners, the supports also serve to impede dust and ash generated during the combustion of the solid fuel from clogging or otherwise disrupting the operation of the gas burners.

Figure 4A:
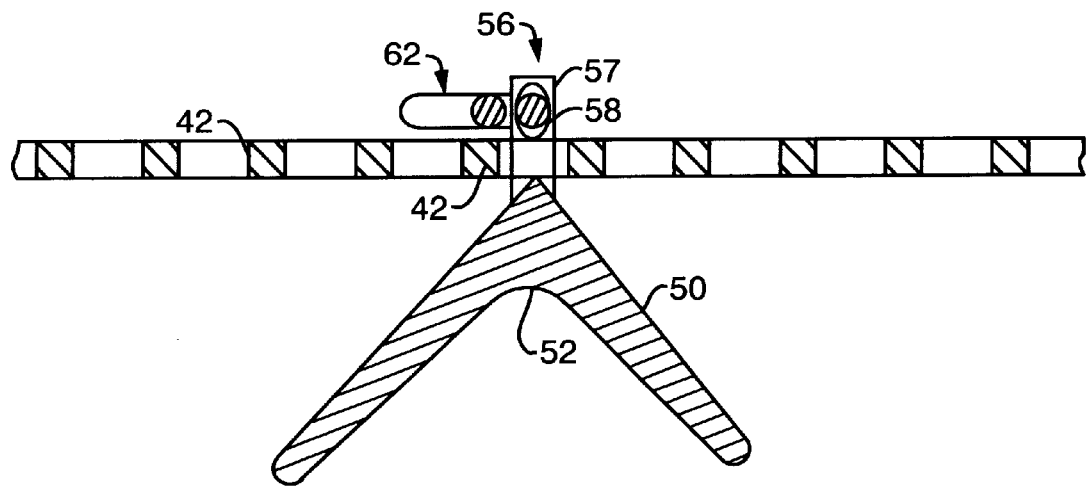
FIG. 4a, 4b, 4c show a portion of the cross-section of the invention along line 2—2 in FIG. 1, with details of three different embodiments of locking means.

FIG. 4a shows one preferred embodiment of a locking means 56 which includes a post 57 which projects through one of the perforations 42 of fuel basket 40. The post 57 has an orifice 58 perpendicular to the axis and passing through the axis of post 57. The orifice lies in a plane adjacent to the plane occupied by the fuel basket. A cotter-pin 62, shown in section, is then inserted through the orifice.

Figure 4B:
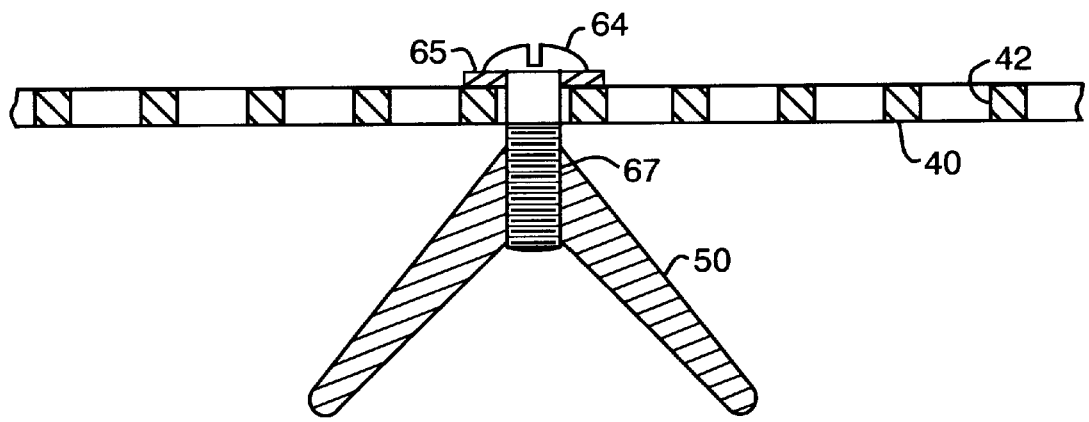

FIG. 4b shows another preferred embodiment of a locking means 56. Support 50 includes at least two threaded holes 67 which are lined up with two of the perforations 42 in fuel basket 40. Screw 64, optionally using washer 65, is then passed through the perforation 42 and into the threaded hole 67. Optionally, instead of a threaded hole 67, the hole could be smooth-bored and screw 64 could be secured with a nut (not shown) underneath support 50. Also contemplated but not shown is at least two threaded shafts secured to the support and extending up through the fuel basket to be secured by a nut. Such a threaded shaft could be secured by press-fit in a hole in the support or by welding it directly to the support.

Figure 4C:
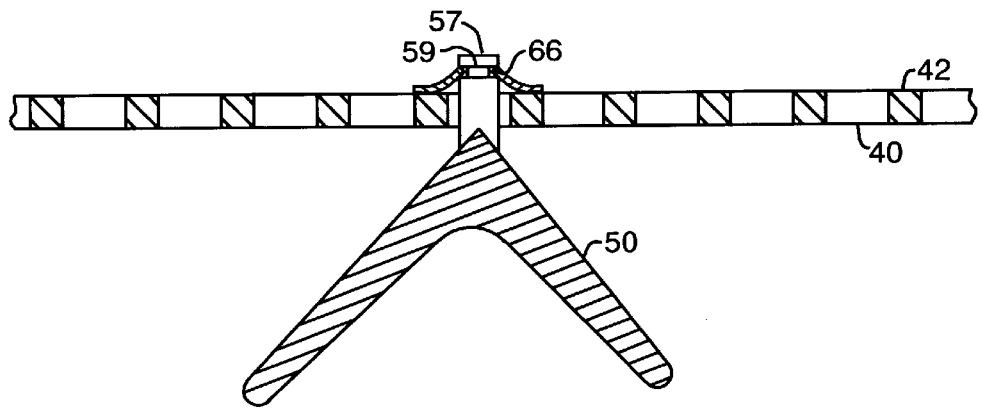

FIG. 4c shows yet another preferred embodiment of a locking means, including at least two posts 57 for each support 50, each post having a groove 59 formed near one end thereof. The post 57 is welded or press-fit to support 50. The post is inserted through a perforation 42 of fuel basket 40 and locked in place by snap-washer 66 which engages the groove 59. Other types of snap-fit washers are contemplated, such as the slide-on type.

Figure 4D:
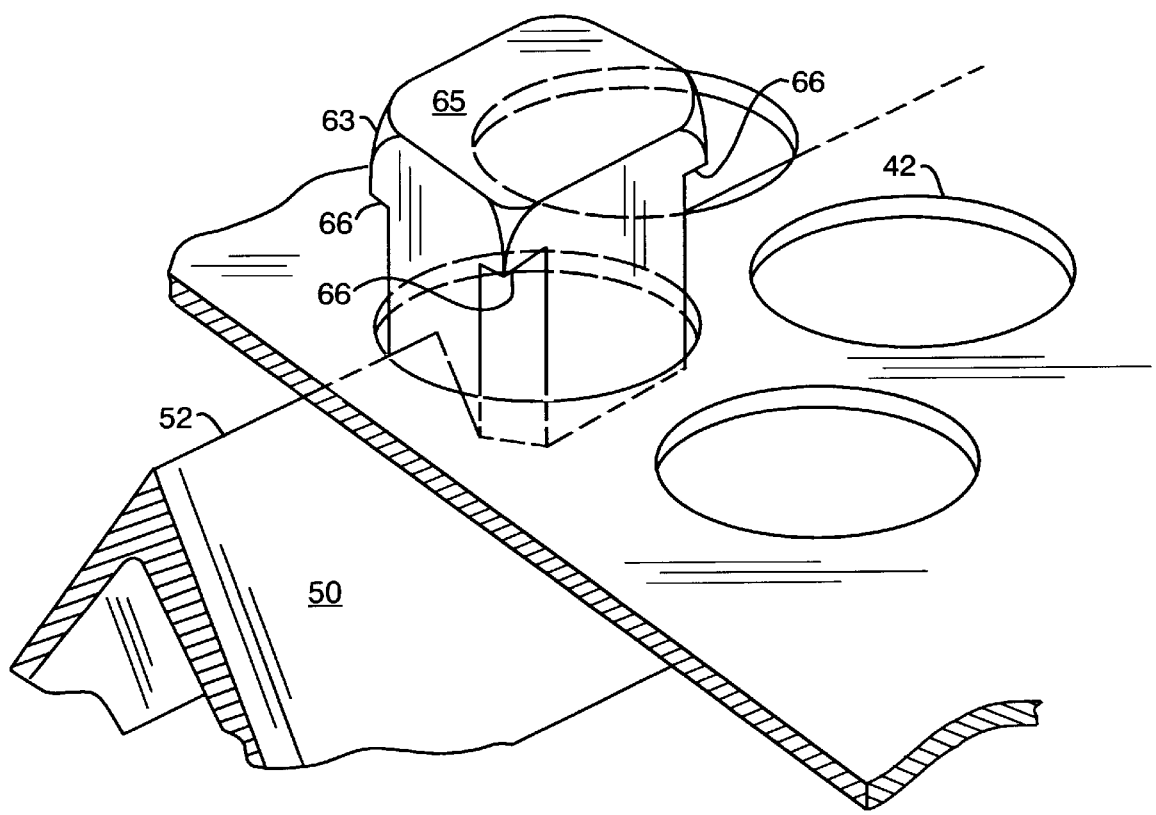
FIG. 4d shows in detail a fourth embodiment of locking means in perspective view with the fuel basket in phantom.

FIG. 4d shows yet another preferred embodiment and is characterized by a post 65 having shoulders 66 extending up from apex 52. Shoulders 66 are preferable corners of post 65 but need not be, so long as they can be pressed through the perforations 42, and engage the perforations 42 to prevent the post 65 from popping out of perforations 42. Post 65 includes rounded corners 63 to enable shoulders 66 to squeeze through perforation 42 during installation.

Other methods for locking the basket 40 and the supports 50 together, to prevent separation due to warping or torquing of the basket due to its subjection to repeated extreme temperature extremes, are also contemplated. For example, high-temperature resistant wires or filaments passing through the perforations in the fuel basket and tightened around the supports to secure the basket in place, or latch-type projections extending through the perforations and latching onto the fuel basket. Another possibility exists in forming projections or metal taps from a deformable material which can be hammered or otherwise bent down, locking the fuel basket against the support.

The invention is operated by placing solid fuel, such as 100% pure wood charcoal into the fuel basket and replacing the cooking grate. The gas burners are ignited and as soon as the solid fuel begins to burn, the gas is shut off. When the solid fuel is glowing, the grill is ready to cook, just like in any other charcoal grill.

In addition to grilling, the invention also allows an ordinary gas grill to operate as a hot or cold smoker. A small amount solid fuel is placed in one corner of the fuel basket, and optionally a few pieces of hardwood such as hickory is placed on top of the solid fuel for flavoring. The cooking grate is replaced and the fuel is ignited using the gas burners original to the grill. Once ignited, the gas burners are shut off. Food is then placed on the cooking grate as far away as possible from the smoldering fuel and/or wood. The cover is then lowered and the food is allowed to smoke. Cold smoking is accomplished in the same manner as hot smoking, except a tray of ice is placed between the food and the fuel, either on the food grate or the fuel basket. This keeps the temperature in the grill down and allows the food to be smoked for flavoring or preservation without significantly cooking it.

Method

The inventive method includes a method of converting a backyard-type gas grill into a wood-burning or charcoal burning grill using the apparatus as described above.

Figure 2:
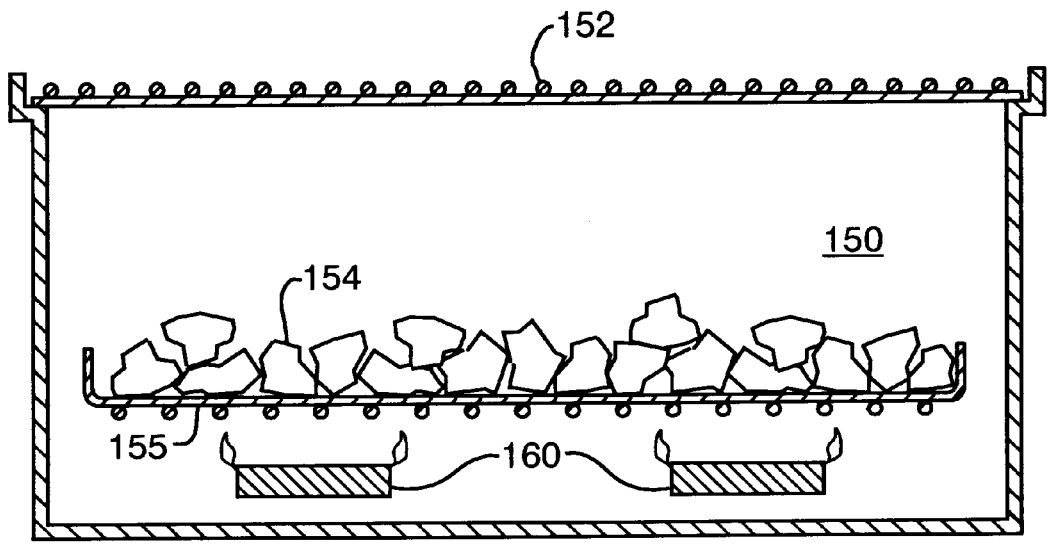
FIG. 2 shows a gas grill of the prior art before the invention is installed.

The invention includes the steps of providing a gas grill 150 of the common backyard type, shown in FIG. 2, removing the cooking grate 152, and any passive radiant heat material, often including radiant bars (not shown), ceramic blocks (not shown), or lava rocks 154 and supports 155 therefore. Thus, the gas burners 160 are exposed. Most gas grills either include two or more straight gas burners 160 which run lengthwise along the bottom of the grill, or else a circular burner (not shown) which runs along the perimeter of the bottom of the grill. If the burners 160 are straight, the supports 50 are placed on top of at least two of them, as seen in FIG. 3. If the burner is circular, then the supports 50 are placed across the burner so that the supports 50 are in a generally parallel configuration. The supports 50 are placed with their apexes 52 pointing up. Then, the fuel basket 40 is placed on top of the supports 50 and locked in place with locking means 56 as discussed above with reference to FIGS. 4a–4d. The cooking grate 152 is then replaced.

After the above procedure is complete, the normal operation of the gas grill as a gas grill is not hindered. However, if the user desires to cook with solid fuel, he or she merely needs to remove the cooking grate 152, put solid fuel, such as wood (or "lump") charcoal 12 or briquettes 13 into the fuel basket 40, and replace the grate. The solid fuel can be easily ignited using the gas burners 160 of the grill. Once the solid fuel is ignited, the gas burners are preferably (though not necessarily) shut off.

Having substantially described the invention, it is understood that the scope of protection sought is limited not be the specificaction above, but by the appended claims.

I claim:

1. An apparatus for insertion in a gas grill having at least one gas burner to enable said gas grill to cook food with solid fuel, comprising:

a tray shaped fuel basket having a bottom and a plurality of raised sides for holding the solid fuel;

at least one fuel basket support member for holding said fuel basket above said at least one gas burner such that said bottom is generally horizontal in orientation and for holding said fuel basket a sufficient distance above said at least one burner to prevent said fuel basket from interfering with the normal operation of said at least one gas burner; and at least two locking means fixing said at least one support member to said fuel basket and preventing separation of said fuel basket from said support members, said locking means enabling said support members to be positioned and locked in place by a consumer in a plurality of positions relative to the bottom of said fuel basket without requiring the application of heat.

2. The apparatus set forth in claim 1 wherein said at least one fuel basket support member comprises two support members each formed from a length of metal and having an L-shaped cross-section, having two legs of approximately equal length joined in right angles at an apex, said apex being attached to said bottom of the fuel basket by said locking means such that each of said legs descends at approximately a 45° angle from said bottom.

3. The apparatus set forth in claim 1 wherein said fuel basket is formed from a high temperature-resistant perforated metal, said perforations are circular, approximately 3/16 inch (4.8 mm) in diameter and approximately 1/4 inch (6.4 mm) center-to-center, said perforations laid out in a honeycomb pattern throughout at least the bottom of the fuel basket.

4. The apparatus set forth in claim 1 wherein said fuel basket is porcelainized to inhibit carbon loss and resulting burn-out of the fuel basket.

5. The apparatus set forth in claim 1 wherein said fuel basket is formed from perforated metal and the locking means include at least two projections permanently attached to and extending from the apex of each support member through respective perforations in said fuel basket, a hole passing through each said projection, each said hole lying in a plane adjacent the plane of the bottom of the fuel basket, and said locking means further including a cotter-pin passing through said hole.

6. The apparatus set forth in claim 1 wherein each said locking means includes a screw-type fastener extending from one of said support and fuel basket and to the other of said support and fuel basket.

7. The apparatus set forth in claim 2 wherein each said screw-type fastener comprises a screw extending through said fuel basket and engaging a threaded hole in said support member.

8. The apparatus set forth in claim 1 wherein each of the locking means includes a lock washer engaging an annular groove adjacent an end of a projection which extends through a perforation in said fuel basket from said support member, said lock washer having a circumference greater than the circumference of the perforation.

9. The apparatus set forth in claim 1 wherein each of said locking means comprises a post extending from said support member through a perforation in said fuel basket, said post having at least one shoulder facing said fuel basket, said shoulders defining a circle having a diameter slightly larger than the diameter of said perforation.

10. A method for converting a gas grill into a grill operable with either gas or solid fuel comprising the steps of exposing and making accessible at least one gas burner near the bottom of the grill by removing any cooking grates, any passive heat radiant material, and any supports for said radiant material;

placing fuel basket support members on said gas burners;

placing a fuel basket on said support members; and locking said fuel basket to said at least one support member thereby preventing unintended separation of said fuel basket from said support members.

11. The method set forth in claim 10 wherein each of said support members comprise a length of metal having an L-shaped cross section having two legs of approximately equal length joined in approximately right angles at an apex, said step of placing said fuel basket support members includes placing said support members on said at least one burner such that the apex of each of said burners points upwardly, away from said at least one burner.

12. The method set forth in claim 10 wherein at least two projections extend from each of said at least one support member, each of the projections having a hole bored transversely through an axis of the projection, said step of placing said fuel basket further comprises inserting said projections through perforations in said fuel basket, said step of locking said fuel basket to said support member includes inserting cotter pins through said holes, which lie in a plane opposite of said fuel basket from said supports, said cotter pins thereby preventing separation of said fuel basket from said at least one support.

13. The method set forth in claim 10 wherein said step of locking said fuel basket to said support member includes inserting a screw through said perforations into said support member and tightening said screw thereby locking said support member and said fuel basket together.

14. The method set forth in claim 10 wherein at least two projections extend from each of said at least one support member, each of the projections having an annular groove near a tip of said projection, said step of placing said fuel basket further comprises inserting said projections through perforations in said fuel basket, said step of locking said fuel basket to said support member includes sliding a snap-washer on each of said projections and snapping said washer into said groove, each said snap-washer having a circumference greater than a circumference of said perforations.

* * * * *